United States Patent
Grigg et al.

(10) Patent No.: US 9,767,503 B2
(45) Date of Patent: Sep. 19, 2017

(54) PAYMENT AUTHORIZATION PROMPTING CATEGORIZATION

(71) Applicant: BANK OF AMERICA CORPORATION, Charlotte, NC (US)

(72) Inventors: David M. Grigg, Rock Hill, SC (US); Matthew A. Calman, Charlotte, NC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 13/690,713

(22) Filed: Nov. 30, 2012

(65) Prior Publication Data
US 2014/0156448 A1   Jun. 5, 2014

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0261* (2013.01)

(58) Field of Classification Search
CPC .......... G06Q 30/0261; G06Q 30/0631; G06Q 40/02; G06Q 30/0639
USPC ................ 705/30, 39, 44; 715/781; 709/204
See application file for complete search history.

(56) References Cited

U.S. PATENT DOCUMENTS

| | | | |
|---|---|---|---|
| 5,433,483 A | 7/1995 | Yu | |
| 5,737,440 A | 4/1998 | Kunkler | |
| 7,540,411 B1 | 6/2009 | Tannenbaum | |
| 7,542,944 B1 | 6/2009 | Drummond et al. | |
| 7,594,611 B1 | 9/2009 | Arrington, III | |
| 7,860,789 B2 | 12/2010 | Hirka et al. | |
| 7,970,669 B1 | 6/2011 | Santos | |
| 8,009,013 B1 | 8/2011 | Hirschfeld et al. | |
| 8,073,759 B1 | 12/2011 | Del Favero et al. | |
| 8,073,772 B2 | 12/2011 | Bishop et al. | |
| 8,195,565 B2 | 6/2012 | Bishop et al. | |

(Continued)

FOREIGN PATENT DOCUMENTS

WO    02/057972 A2    7/2002

OTHER PUBLICATIONS

Utility U.S. Appl. No. 12/821,631, filed Jun. 23, 2010.

*Primary Examiner* — Vanel Frenel
(74) *Attorney, Agent, or Firm* — Michael A. Springs; Moore & Van Allen PLLC; Patrick B. Horne

(57) ABSTRACT

Systems, methods, and computer program products are provided for prompting categorization during payment authorization. The system includes a computer apparatus including a processor and a memory; and a software module stored in the memory. The software module includes executable instructions that when executed by the processor cause the processor receive an authorization request for a transaction being conducted by a user; prompt the user to categorize at least one component of the transaction; receive a category from the user for the at least one component of the transaction; and store the category in association with the transaction. In some embodiments, the system will not authorize the transaction until the user categorizes at least one component of the transaction. In further embodiments, the system evaluates the transaction and only prompts the user to categorize the transaction if predefined criteria are met.

21 Claims, 9 Drawing Sheets

(56) References Cited

U.S. PATENT DOCUMENTS

| | | |
|---|---|---|
| 8,260,699 B2 | 9/2012 | Smith et al. |
| 2003/0004743 A1 | 1/2003 | Callegari |
| 2003/0149578 A1* | 8/2003 | Wong ................ G06Q 10/087 705/7.22 |
| 2004/0225613 A1 | 11/2004 | Narayanaswami et al. |
| 2006/0196930 A1 | 9/2006 | Hart et al. |
| 2007/0012758 A1 | 1/2007 | Wilson |
| 2007/0168265 A1 | 7/2007 | Rosenberger |
| 2008/0010126 A1 | 1/2008 | Gunshor et al. |
| 2008/0120168 A1 | 5/2008 | Hughes |
| 2008/0195496 A1 | 8/2008 | Hwang |
| 2008/0228637 A1 | 9/2008 | Scipioni et al. |
| 2009/0012704 A1 | 1/2009 | Franco et al. |
| 2009/0047972 A1* | 2/2009 | Neeraj ................ G06Q 10/10 455/456.1 |
| 2009/0112763 A1 | 4/2009 | Scipioni et al. |
| 2009/0192904 A1 | 7/2009 | Patterson et al. |
| 2009/0234766 A1 | 9/2009 | Tannenbaum |
| 2009/0240605 A1 | 9/2009 | Rukonic et al. |
| 2009/0271287 A1 | 10/2009 | Halpern |
| 2010/0057574 A1 | 3/2010 | Banerjee et al. |
| 2010/0125495 A1 | 5/2010 | Smith et al. |
| 2010/0138344 A1 | 6/2010 | Wong et al. |
| 2010/0153224 A1 | 6/2010 | Livnat |
| 2010/0241507 A1 | 9/2010 | Quinn et al. |
| 2010/0287085 A1 | 11/2010 | Joubert et al. |
| 2010/0305855 A1 | 12/2010 | Dutton et al. |
| 2011/0029416 A1 | 2/2011 | Greenspan |
| 2011/0099063 A1 | 4/2011 | Clemmons |
| 2011/0191184 A1 | 8/2011 | Blackhurst et al. |
| 2011/0196795 A1 | 8/2011 | Pointer |
| 2011/0208659 A1 | 8/2011 | Easterly et al. |
| 2011/0276385 A1 | 11/2011 | Keller |
| 2011/0320294 A1 | 12/2011 | Votaw et al. |
| 2012/0123904 A1 | 5/2012 | Foerster |
| 2012/0190386 A1 | 7/2012 | Anderson |
| 2012/0197773 A1 | 8/2012 | Grigg et al. |
| 2012/0213441 A1 | 8/2012 | Pandipati |
| 2012/0245995 A1 | 9/2012 | Chawla |
| 2012/0265685 A1 | 10/2012 | Brudnicki et al. |
| 2012/0270567 A1* | 10/2012 | Johnson ............ H04W 76/021 455/456.3 |
| 2013/0124362 A1 | 5/2013 | Katcher |
| 2013/0179336 A1* | 7/2013 | Lyons ................ G06Q 20/30 705/39 |
| 2014/0006198 A1* | 1/2014 | Daly ................ G06Q 30/06 705/24 |

* cited by examiner

PAYMENT AUTHORIZATION PROMPTING CATEGORIZATION

BACKGROUND

Consumers often make purchases at various locations and stores. In order to track spending, some users prefer to categorize transactions. Currently, users categorize the transactions after the transaction has already occurred. For example, a user may log-in to the user's account hours or days after the transaction has occurred and manually input categories for the transaction. When the user categorizes a transaction after the transaction has already occurred, the user is much less likely to remember to categorize the transaction or to do so correctly. In this manner, the user has much less control over budgeting and categorization of transactions.

BRIEF SUMMARY

Embodiments of the present invention provide a system for prompting categorization during payment authorization. The system includes a computer apparatus including a processor and a memory; and a software module stored in the memory, comprising executable instructions that when executed by the processor cause the processor to: receive an authorization request for a transaction being conducted by a user; prompt the user to categorize at least one component of the transaction; receive a category from the user for the at least one component of the transaction; and store the category in association with the transaction.

In some embodiments, the module is further configured to authorize the transaction when the user categorizes at least one component of the transaction. The module may be configured to: determine whether the transaction meets predefined criteria; and prompt the user to categorize at least one component of the transaction when the transaction meets the predefined criteria. For example, the predefined criteria may be selected from the group consisting of an amount, a time, a merchant, and a location. In an embodiment, the module is further configured to: track the user's location; determine that the user is proximate to a merchant; identify the merchant; and suggest categories based on products and/or services that the merchant provides. The module may be configured to: access a database comprising a plurality of merchants and associated categories; and suggest categories based on the most frequently associated categories relating to the merchant. In some embodiments, the user is prompted to categorize the transaction using a mobile device and the system receives the category from the user via the mobile device. In a still further embodiment, the mobile device receives a verbal input from the user providing the category.

In another aspect, a computer program product for prompting categorization during payment authorization is provided. The computer program product includes a non-transitory computer readable storage medium having computer readable program code embodied therewith, the computer readable program code comprising: a computer readable program code configured to receive an authorization request for a transaction being conducted by a user; a computer readable program code configured to prompt the user to categorize at least one component of the transaction; a computer readable program code configured to receive a category from the user for the at least one component of the transaction; and a computer readable program code configured to store the category in association with the transaction.

In an embodiment, the computer program product further includes a computer readable program code configured to authorize the transaction when the user categorizes at least one component of the transaction. The computer program product may also include computer readable program code configured to: determine whether the transaction meets predefined criteria; and prompt the user to categorize at least one component of the transaction when the transaction meets the predefined criteria. The predefined criteria may be selected from the group consisting of an amount, a time, a merchant, and a location. In an embodiment, the computer program product further includes computer readable program code configured to: track the user's location; determine that the user is proximate to a merchant; identify the merchant; and suggest categories based on products and/or services that the merchant provides. In some embodiments, the computer program product further includes computer readable program code configured to: access a database comprising a plurality of merchants and associated categories; and suggest categories based on the most frequently associated categories relating to the merchant. The user may be prompted to categorize the transaction using a mobile device and the system receives the category from the user via the mobile device.

In a further aspect, a method for prompting categorization during payment authorization is provided. The method includes using a computer processor comprising computer program code instructions stored in a non-transitory computer readable medium, wherein said computer program code instructions are structured to cause said computer processor to: receive an authorization request for a transaction being conducted by a user; prompt, via a computing device processor, the user to categorize at least one component of the transaction; receive a category from the user for the at least one component of the transaction; store the category in association with the transaction.

In some embodiments, the method includes authorizing the transaction when the user categorizes at least one component of the transaction. The method may also include determining whether the transaction meets predefined criteria; and prompting the user to categorize at least one component of the transaction when the transaction meets the predefined criteria. The predefined criteria may be selected from the group consisting of an amount, a time, a merchant, and a location. In some embodiments, the method also includes tracking the user's location; determining that the user is proximate to a merchant; identifying the merchant; accessing a database comprising a plurality of merchants and associated categories; and suggesting categories based on the most frequently associated categories relating to products and/or services that the merchant provides.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
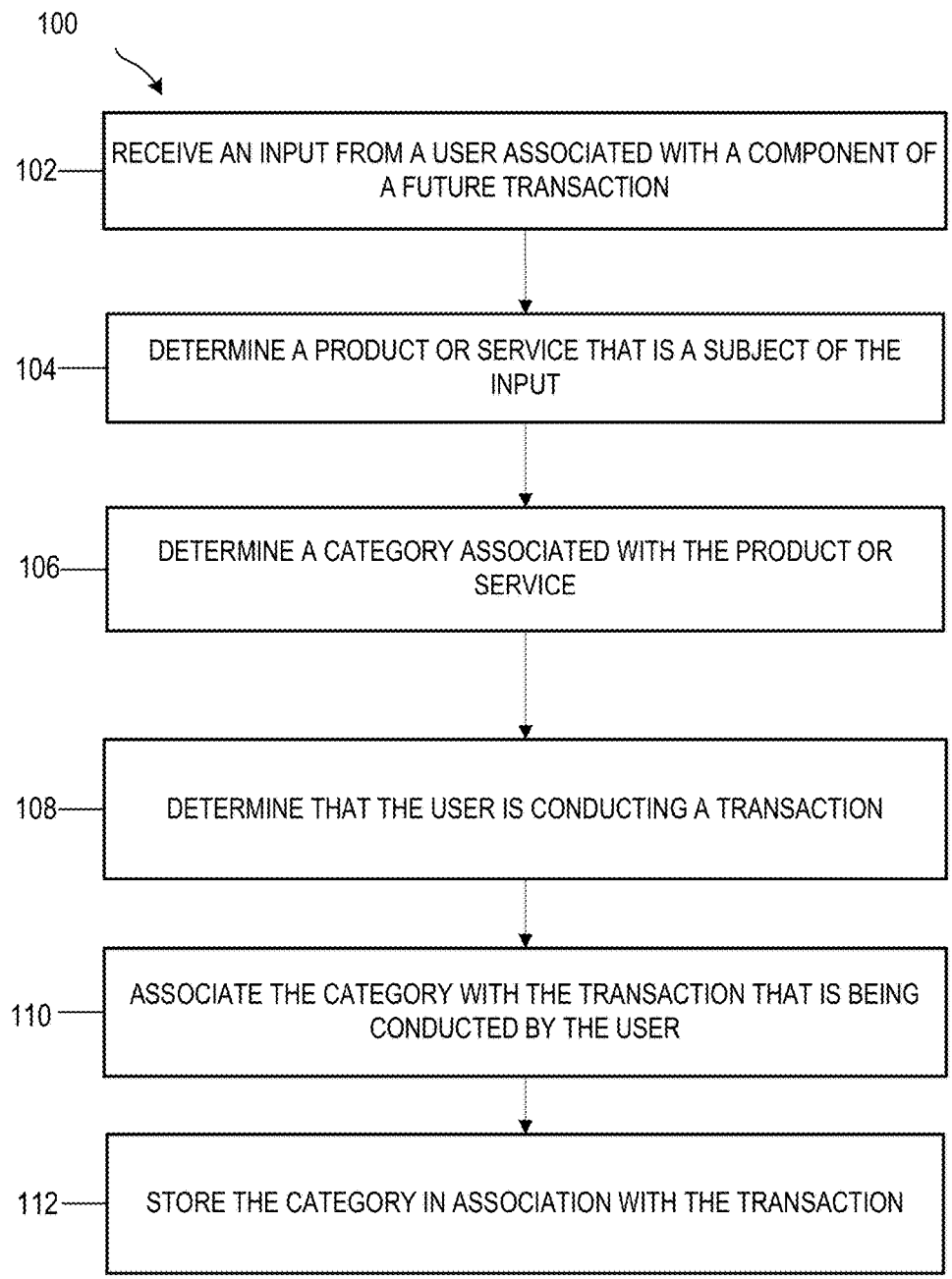
Figure 2:
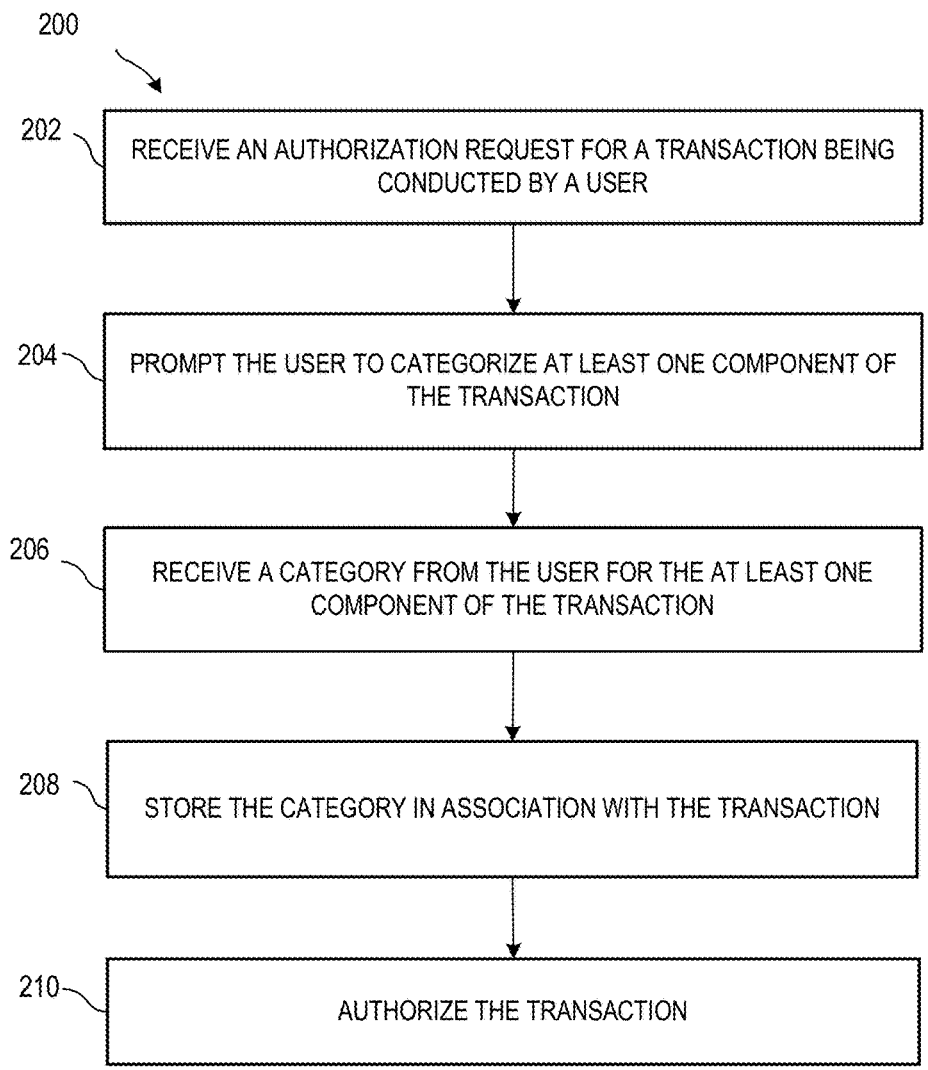
Figure 3:
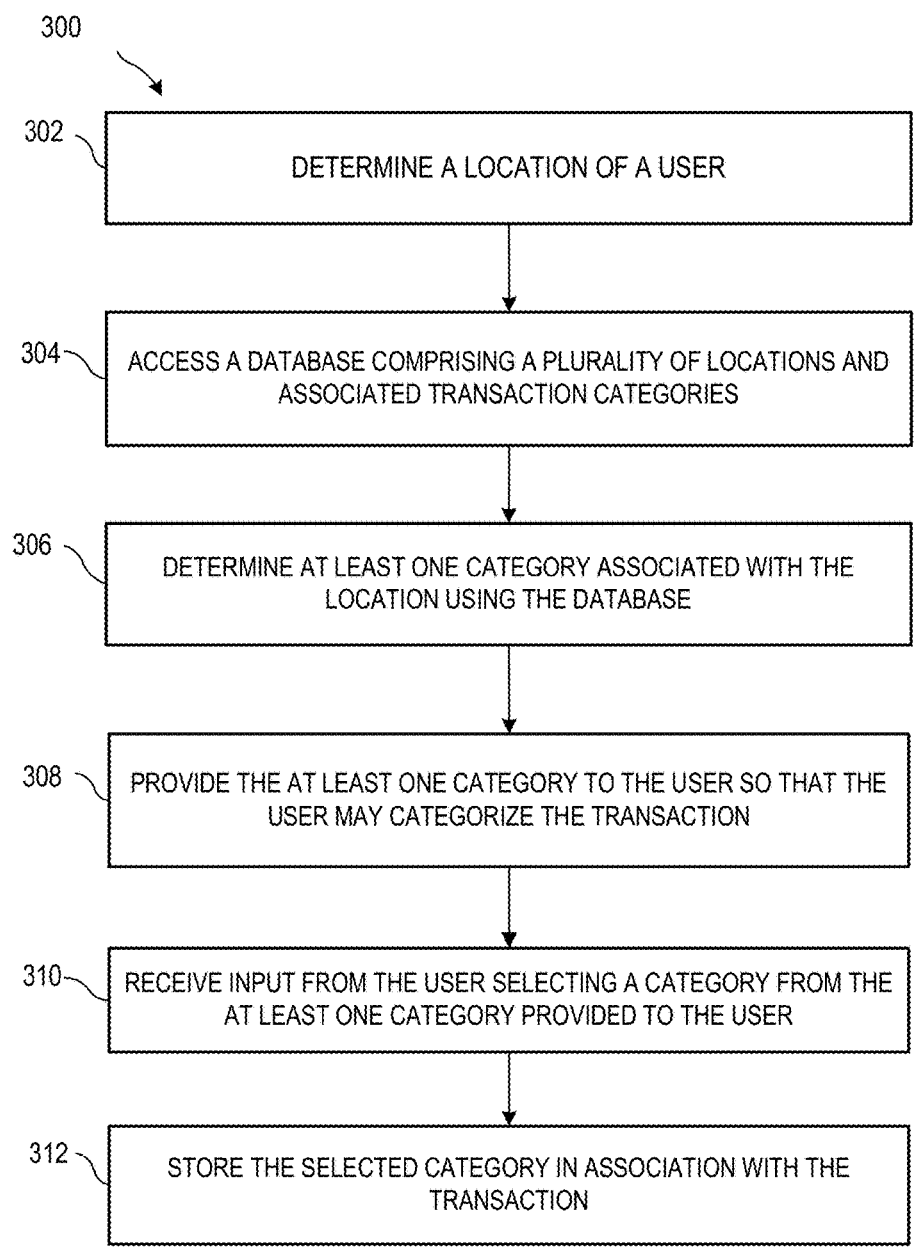
Figure 4:
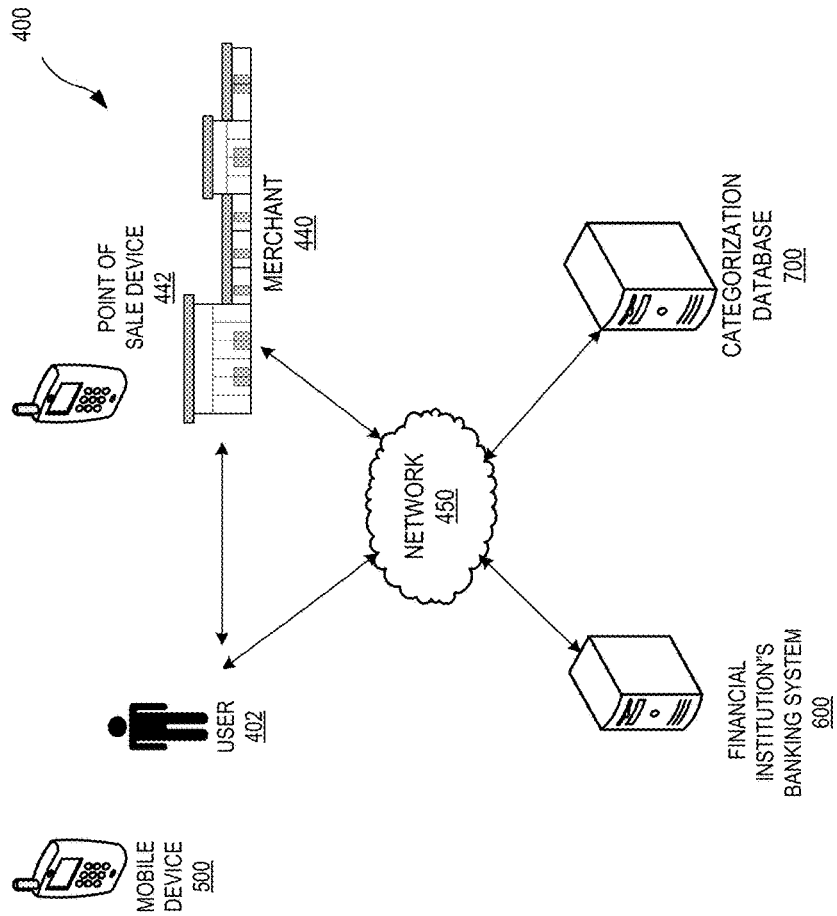
Figure 5:
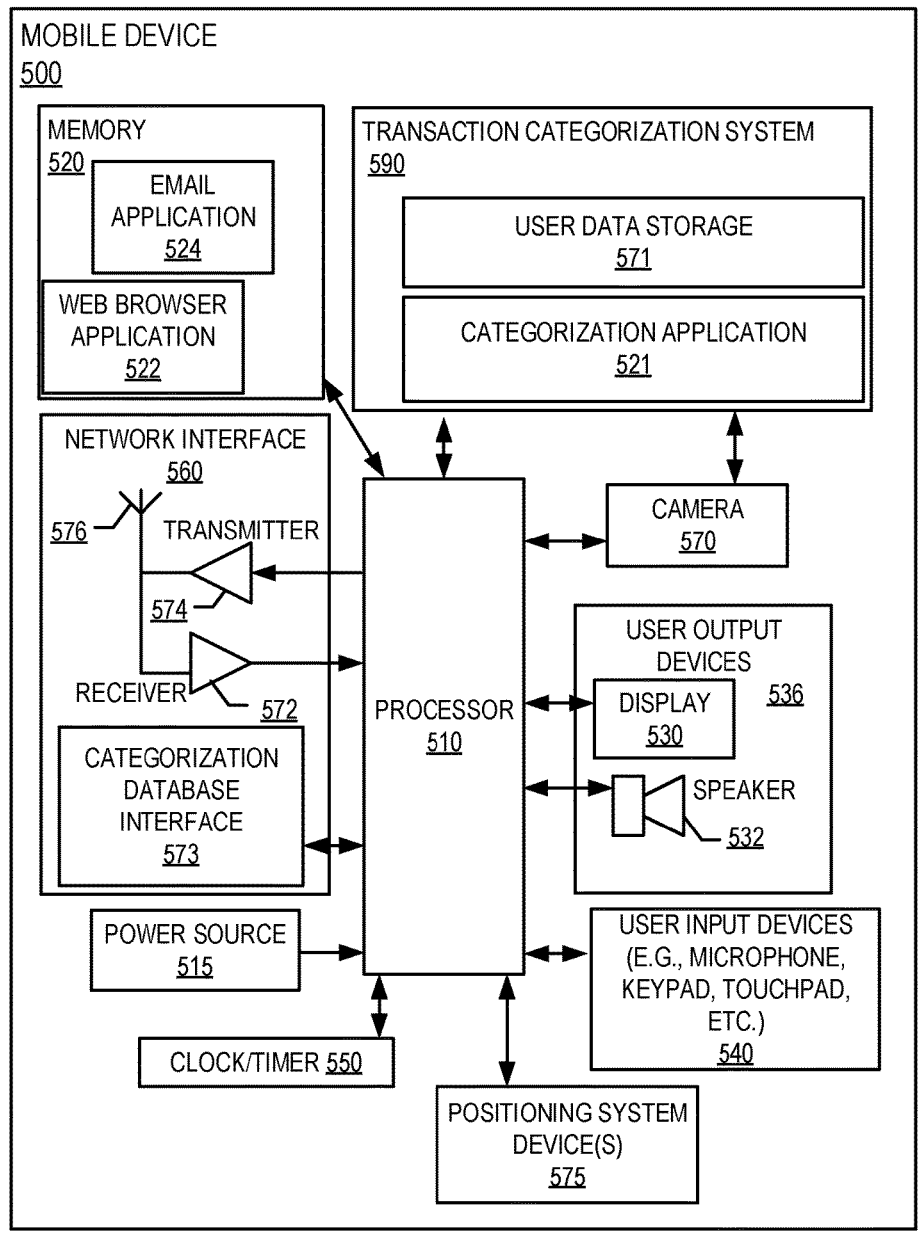

Having thus described embodiments of the invention in general terms, reference will now be made the accompanying drawings, wherein:

FIG. 1 is a flowchart of a system and method for categorizing transactions prior to authorization in accordance with various embodiments of the invention;

FIG. 2 is a is a flowchart of a system and method for prompting categorization during payment authorization in accordance with an embodiment of the invention;

FIG. 3 is a is a flowchart of a system and method for providing suggested transaction categories based on location in accordance with an embodiment of the invention;

FIG. 4 provides a block diagram illustrating a transaction categorization system and environment in accordance with various embodiments of the invention;

FIG. 5 provides a block diagram illustrating a mobile device, in accordance with an embodiment of the invention.

Figure 6:
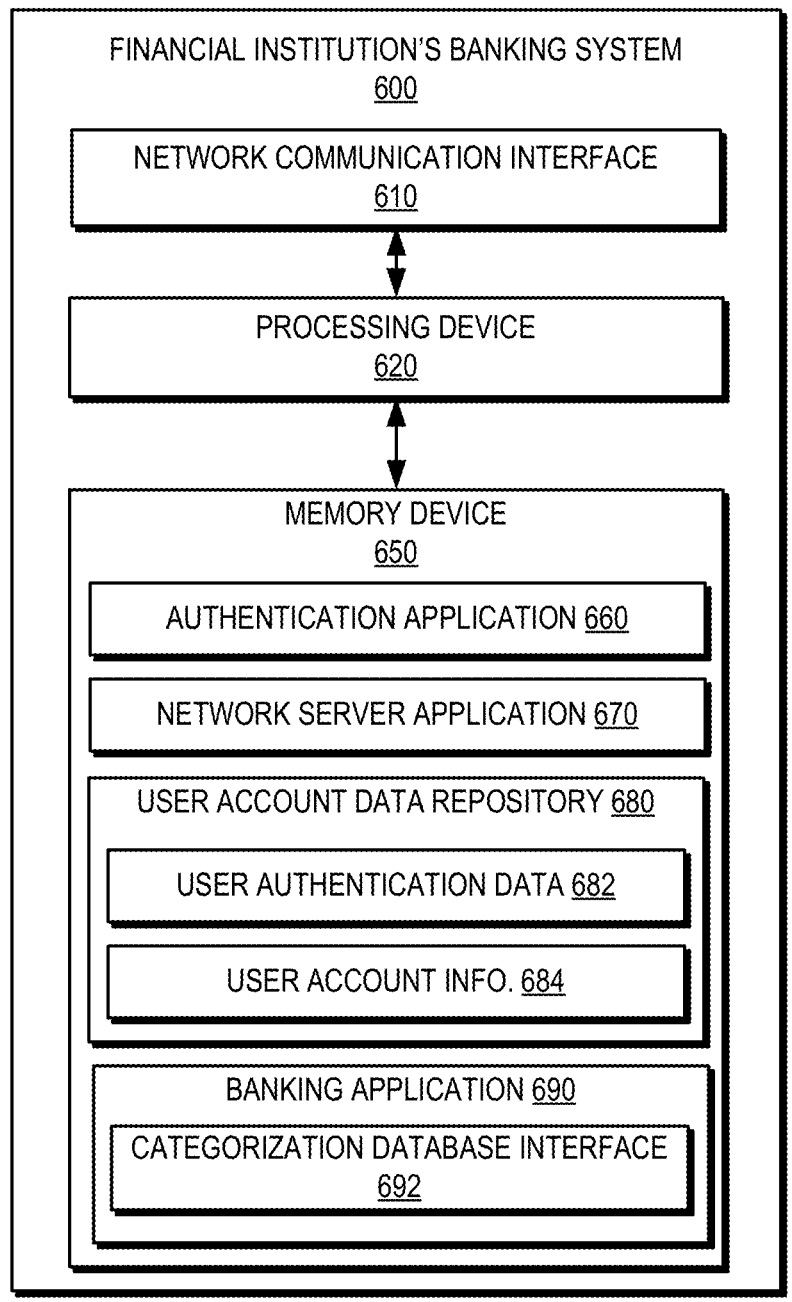
Figure 7:
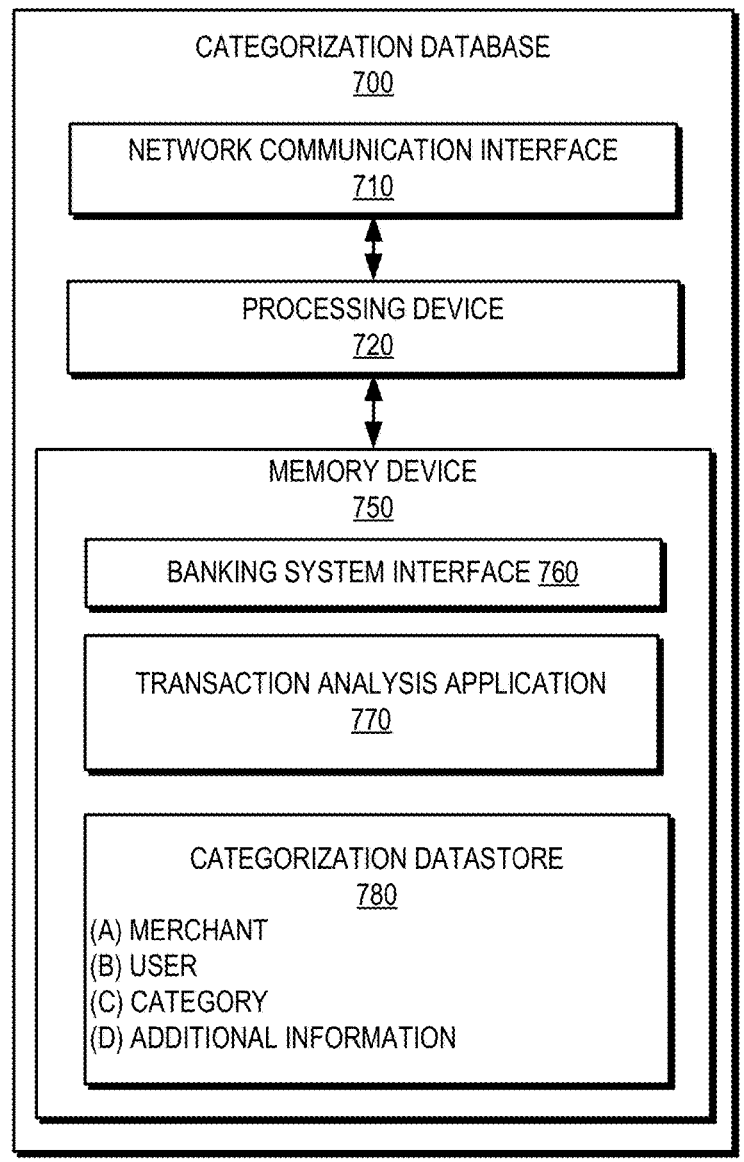
Figure 8A:
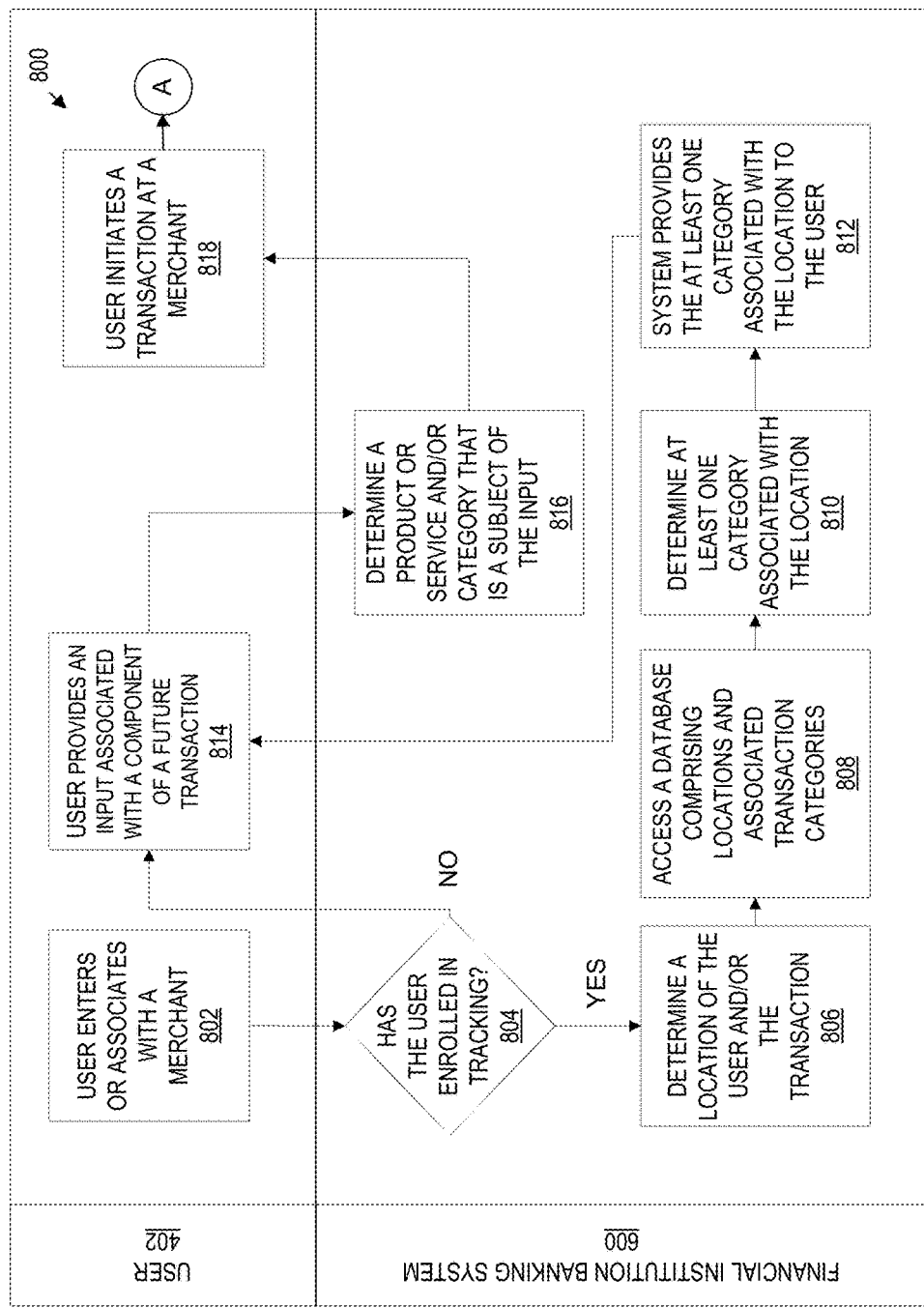
Figure 8B:
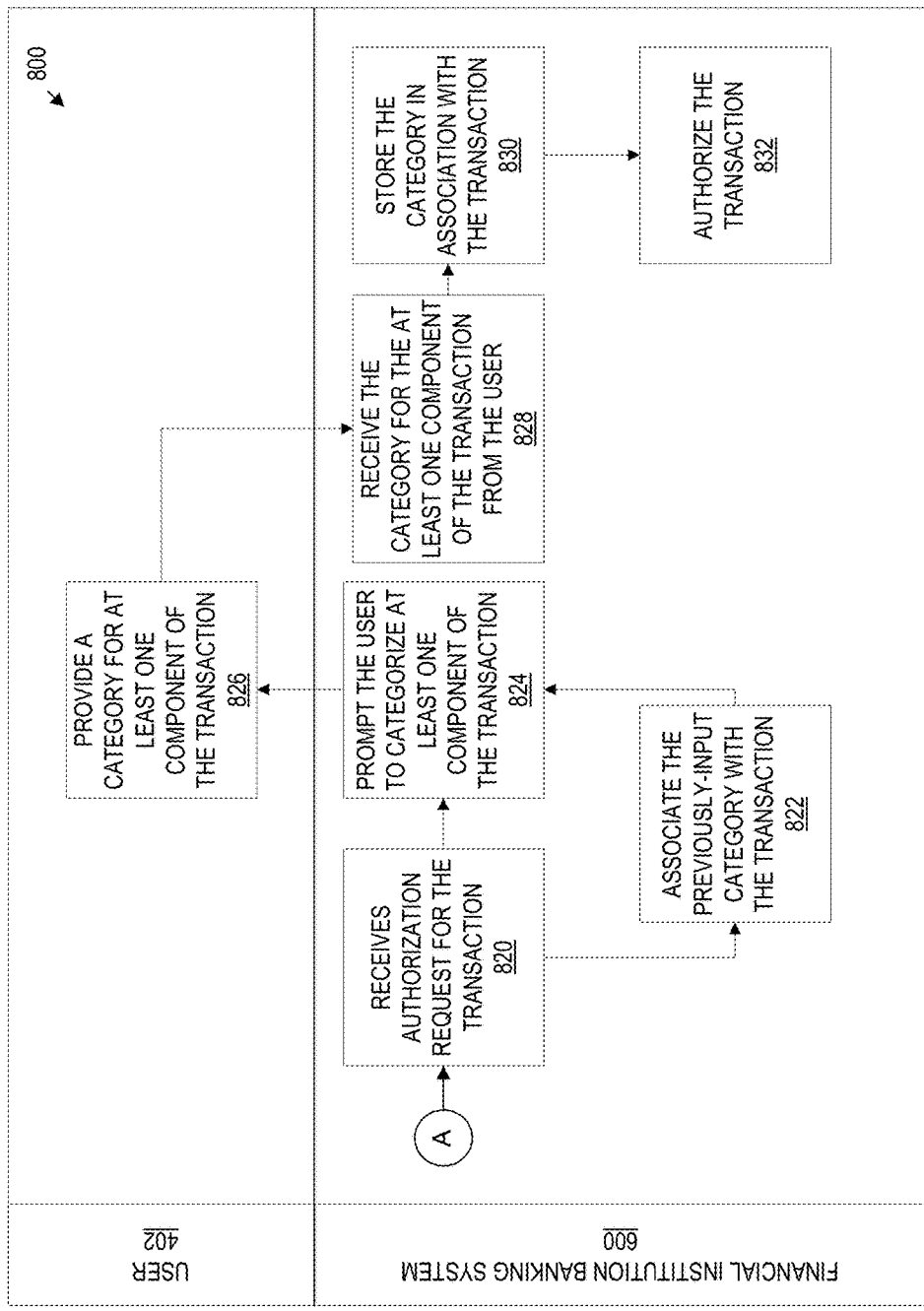

FIG. 6 provides a block diagram illustrating a financial institution's banking system, in accordance with an embodiment of the invention;

FIG. 7 provides a block diagram illustrating a categorization database, in accordance with an embodiment of the invention; and FIGS. 8A and 8B provides a block diagram illustrating systems and methods for categorizing transactions, in accordance with embodiments of the invention.

DETAILED DESCRIPTION OF EMBODIMENTS OF THE INVENTION

The embodiments presented herein are directed to systems and methods for prompting categorization during payment authorization. In some embodiments, the system includes a computer apparatus including a processor and a memory; and a software module stored in the memory, comprising executable instructions that when executed by the processor cause the processor to: receive an authorization request for a transaction being conducted by a user; prompt the user to categorize at least one component of the transaction; receive a category from the user for the at least one component of the transaction; and store the category in association with the transaction. The system allows user to categorize all or parts of a transaction prior to the transaction occurring or during the occurrence of the transaction and in this manner more accurately capture expenses within categories.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. Additionally, while embodiments are disclosed as "comprising" elements, it should be understood that the embodiments may also "consist of" elements or "consist essentially of" elements.

In accordance with embodiments of the invention, the terms "financial institution" or "financial entity" include any organization that processes financial transactions including, but not limited to, banks, credit unions, savings and loan associations, investment companies, stock brokerages, asset management firms, insurance companies and the like. As used herein, the term "user" includes a customer of a financial institution, a financial account holder, an agent of an account holder, a user associated with a payment device, a merchant, an employee of a merchant, a business or non-profit entity, and the like. The term "merchant" may mean a brick and mortar merchant, an internet retailer a service provider, a mobile merchant, or the like, and thus a point of sale for a transaction may instead by a time of sale for the transaction.

FIG. 1 is a flowchart providing an overview of a system and method 100 for categorizing transactions prior to authorization, in accordance with an embodiment of the transaction. It will be understood that one or more devices, such as one or more mobile device and/or one or more other computing devices and/or servers, can be configured to perform one or more steps of the system and method 100. In some embodiments, the one or more devices performing the steps are associated with a financial institution. In other embodiments, the one or more devices performing the steps are associated with a business, third party, and/or user. For example, in some embodiments, a "node" connects several networks or financial institutions such that money can be transferred from one customer of a financial institution to another customer of a different financial institution.

As illustrated at block 102, the system 100 receives an input from a user associated with a component of a future transaction. In an embodiment, the user uses a mobile device to provide an input to the system regarding a product or service that the user is considering purchasing at a future time. For example, the user may input products before placing the products into a cart. In some embodiments, the mobile device has multiple input devices for receiving input from the user. For example, the mobile device may include a camera, a touch pad or keyboard, a microphone, a positioning system device, or other input devices that allow users to input information, either directly or indirectly, and provide an input regarding a component of a future transaction. The user may enter a category on a list, such as a list of suggested categories provided by the system. The user may take a picture of the product or service as an input. The user may verbally input the category. It should be understood that other input method may be included in the system.

In some embodiments, a component is a part of a transaction. For example, a user may conduct a single transaction at a gas station for $50.00. That transaction may include two components: $40.00 for gasoline and $10.00 for drinks. In some embodiments, the component is the entirety of the transaction, such as when the user is purchasing a single item in a transaction, but in many situations multiple products or services, i.e., components, are being purchased in a single transaction. The various components in a transaction may be in separate categories, as in the example with gasoline and drinks, or the components may be in the same category. In an embodiment, components may be of different fundamental types. For example, a single transaction may include both services and products that are purchased.

In an embodiment, a future transaction is a transaction that occurs at a later point in time from when the user provides the input. Unless specifically limited by the context, a "transaction" refers to any communication between the user and the financial institution or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, a future transaction is one that will occur within a predetermined period of time. In an embodiment, the predetermined period of time is provided by the financial institution. For example, the predetermined period of time may be until the next calendar day or 24 hours. In a further embodiment, the predetermined period of time is provided by the user. For example, the user may decide that user input should only be saved for one hour before being deleted. In a still further embodiment, the period of time between the input and the future transaction is a function of the input. For example, certain types of input may be saved for a future transaction for a longer period of time than other types of input. For example, input that is associated with an expensive product may be saved for a longer period of time than input that is associated with an inexpensive product. The rationale for saving input for different periods of time is that users may not care whether small, inconsequential purchases are categorized but may be more concerned about categorizing, and receiving assistance in categorizing, significant purchases. As the system evaluates the product prior to the transaction, the system may be able to determine without input from the user whether the length of time between the input and the future transaction be extended beyond a default length of time.

As illustrated at block 104, the system 100 determines a product or service that is a subject of the input. In some embodiments, the user scans the product or service using a camera on the mobile device. The user may scan a bar code on the product to identify the product, which is then stored in memory in the device. In some embodiments, scanning of the bar code may provide additional information, such as the cost of the item, the last time that the item was purchased by the user, competitive prices for the item at other retailers, and other information regarding the item.

In an embodiment, the user takes a picture or video of the product or service and object identification software identifies the product or service, such as based on comparison to standard images or based on identification of distinguishing features. In an embodiment, the system aggregates images from various users as well as products and/or categories provided by users, merchants, or suppliers, and then uses these images as reference images for comparison to input from the user. For example, the system may include a database of images and associated products provided by manufacturers of the products. As the system is used, users will input images and through some process associate products with those images. For example, users may take a picture of a product and type in the name of the product or take a picture of a product and then scan a barcode associated with the product. As the database of images and products is built up through user, the system will learn to identify even more products and assist the user in determine the product.

In a further embodiment, the user types in the name of the product or service. In this embodiment, the system may autocomplete the name of the product based on pattern analysis of the user's transaction history, based on the user's location as will be discussed in greater detail later, or based on a predictive algorithm using at least one of the user's location, the user's history, and the time of day. For example, the user may be making a purchase at 7 am. If the user's transaction history indicates that the user typically buys coffee at 7 am, then the system may automatically suggest to the user that a photograph of a cup taken by the user be categorized in the "coffee shop" category.

In some embodiments, the system receives input from a merchant device. For example, a merchant system may wirelessly connect with the user device and provide input as to an intended purchase. The merchant may have transmitters and/or receivers associated with products or services in the store. A transmitter, such as an RFID or NFC transmitter, may be adjacent to or associated with a product and when the user brings a wireless-enabled mobile device in proximity to the transmitter, the system may receive an input for a future transaction. Similarly, the merchant device may be a vending machine. As the user conducts a purchase at the vending machine, the user device wirelessly connects to the vending machine and associates a category with the transaction.

In some embodiments, the merchant device is a device entirely supplied by the merchant. For example, the user may be provided a scanner, RFID-enabled tag, or other device that can provide input to the system as the user proceeds through the store. The tag may provide an input based on the location of the user in the store and products or services that are known to be present at the location. In a still further embodiment, containers provided by the merchant, e.g., carts and baskets, may be configured to provide an input to the system. For example, when a user places a product in the container, the container may identify the product, e.g., using radio-tags, digital bar codes, or the like, and then communicate identity of the product to the system.

In a further embodiment, the user provides an input to the system by speaking into a microphone associated with a mobile device. For example, the user may say a keyword or phrase into the microphone, such as "oil change." In this manner, services that may not be easy to capture in an image can still be provided to the system as an input. Of course, products may also be input via voice recognition software. For example, "coffee" may be input into a microphone when the user enters a coffee shop, thus priming the system to associate a future transaction with the "coffee shop" category.

As illustrated at block 106, in some embodiments the system 100 determines a category associated with the product or service. In an embodiment, a category is a characterization of an expense or transfer performed by the user. As is understood, when users track expenses or transfers, the user may wish to know how the user's money is being used. By using categories, the user is better able to view trends in expenses and transfers and generalize how the user's money is being used. Categories may be default categories provided by the system, financial institution, or merchant, or may be customized categories provided by the user. In an embodiment, a combination of default categories and personalized categories may also be used.

As discussed, in some embodiments the system determines the category associated with the product or service based on the input from the user. For example, the user may provide a category associated with the product when the user provides the input. The user may take a picture of a loaf of bread and type into the mobile device that the product is to be categorized as groceries. In another embodiment, the user verbally inputs the category as the input, for example, speaking the word "coffee" into the mobile device when entering a coffee shop.

In one embodiment, a user provides percentages for specific categories within a transaction. For example, the user may be categorizing a transaction and indicate that 60% of the transaction should be categorized as groceries and 40% of the transaction should be categorized as pharmacy products. In this way, the user is able to generalize categories rather than categorizing every product or service included in the transaction.

In another embodiment, a user provides a currency amount for specific categories within the transaction. For example, the user may indicate that $70 of a $100 transaction is categorized as household expenses, $20 of the transaction is categorized as gifts, and $10 of the transaction is uncategorized. Similarly to providing percentages, this allows a user to generalize categories for the transaction and not select individual categories for every product or service associated with the transaction.

In a still further embodiment, a user provides categories based on individuals in addition to the category of product or service. For example, a user may indicate that a product or service is categorized in the school expenses category and is associated with individual A. By allowing users to associate products or services with more than one category, e.g., product category and associated-individual category, the system allows users to track expenses within a family, for instance.

In an exemplary embodiment, specific subcategories may be provided based on individual, business, or government needs. For example, a user may desire to categorize all purchases that qualify for a flexible spending account so that the user can easily identify reimbursable products or services. Similarly, a user may desire to categorize all expenses that qualify as business expenses for tax purposes or in order to request reimbursement from the user's employer. In another example of specific subcategories, the user may desire to categorize all charitable donations for tax purposes. For example, if a user conducts a transaction at a store that includes $10 of charitable giving and $30 of personal purchases, the user may desire to keep a record of the charitable giving to assist in filing taxes at a later date.

It should be understood that different users may provide different levels of detail with respect to categorization. For example, a first user may desire to only categorize purchases at a grocery store as belonging to a "grocery" category. A second user, however, may wish to subcategorize purchases within a grocery store as "meat," "baked goods," and "vegetables." A third user may wish to subcategorize even further, such as in differentiating between "organic vegetables" and "conventional vegetables." Users may change their level of categorization for different transactions.

In a further embodiment, the system determines the category associated with the product or service. Based on identification of the product or service, the system may automatically categorize or suggest a category for the product or service that was the subject of the input. When the system automatically categorizes the product or service, the system does so based on evaluating an association between the product or service and a category stored in a database accessible to the system. For example, the system may always categorize an expense at a hotel as a "vacation lodging" expense. In some embodiments, however, this automatic categorization may be superseded by user input. For example, the user may have conducted a transaction at a hotel restaurant and desires to have the transaction or a part of the transaction categorized in an "eating out" category instead of a "vacation lodging" category. In this situation, the system assists the user in categorizing components of transactions but still provides the flexibility to correct or alter system-supplied categorizations. In a still further embodiment, the system determines the category for a product based on a SKU or barcode associated with the product. For example, the system may identify the barcode, determine that the product is a household appliance, and categorize the product as a home good.

In an embodiment, a category is associated with a product or service if the category represents a need or a want for the user that the product or service meets. In this manner, a product or service may be categorized in different categories depending upon the reason that the use purchased the product or service. For example, a cake may be purchased for personal consumption or may be purchased as a gift. Thus, depending on the reason for the purchase, the user may desire to categorize the cake may be categorized as groceries or as a gift.

In some embodiments, the system also provides offers to the user based at least in part on the input, the category, or the product. For example, the system may provide coupons or deals associated with the product or an associated product. The system allows the merchant or the financial institution to know that the user is in the merchant, is considering conducting a transaction, and may be induced to purchase related items or items from competitors. The offers may include discounts, loyalty rewards, extended warranties, or other add-on products or services.

As illustrated in block 108, the system 100 determines that the user is conducting a transaction. In an embodiment, the system receives data associated with a transaction at a point-of-transaction device, wherein the data includes financial account information. In an embodiment, the system receives the data over a network, such as a transaction processing network or wireless network. The data may be encrypted for security. In some embodiments, the data include financial account information or a proxy for financial account information. For example, the data may include the name and/or financial account number of a first party, e.g., a payor, to the transaction and an account number and/or financial account number of a second party, e.g., a payee. The data may further include the amount of the transaction, the time and date of the transaction, the location of the transaction, a category of the transaction, or other information.

The point-of-transaction device is a device that facilitates the transaction between the user and the business or organization. In an embodiment, the point-of-transaction device is a cash register at a store. In other example, the point-of-transaction device is mobile, such as a mobile ice cream truck. In other embodiments, however, the point-of-transaction device is associated with commerce but does not process a transaction. For example, the user may be having a credit check run. Automated teller machines (ATMs) are also considered point-of-transaction devices that may trigger offers to proximately located businesses or organizations. The user can initiate the transaction at a variety of point-of-transaction devices, thereby triggering proximately-located offers.

In some embodiments, the system identifies, using a computing device processor, a user associated with the financial account information. In some embodiments, the system identifies the user by identifying an account number associated with the transaction and then matches the account number with the user. In another embodiment, the user is identified from the data received from the transaction. In some embodiments, the user conducts a transaction using a mobile device, such as a mobile payment application on a phone. In other embodiments, however, the user is identified by the user's use of a credit card, debit card, rewards card, or personal check. In some embodiments, the system identifies the user in conjunction with a financial institution database. In other embodiments, the system identifies the user from secondary sources such as social networking sites.

As illustrated in block 110, the system 100 associates the category with the transaction that is being conducted by the user. In some embodiments, the system associates the category with the next transaction that is conducted by the user. In this embodiment, the user may scan an item as the user is shopping and then when the user goes to complete a transaction in the store, the system suggests or automatically applies the category to the transaction. As discussed, in an embodiment, the category is applied if the time between the user input and the transaction is less than a predetermined amount. In another embodiment, the category is associated with the transaction if the input was provided within a predetermined geographic region of the transaction being conducted. For example, a user may provide an input at location X and at a later point in time conduct a transaction at location Y. If the distance between location X and location Y is below a predefined amount, then the system may associate the category with the transaction.

In a further embodiment, each time the user conducts a transaction a list of previously categorized products or services may be displayed to the user for the user to select which of the previous inputs should be associated with the transaction. In an embodiment, only those inputs provided within a predetermined period of time of the transaction are displayed to the user.

Turning now to block 112, in some embodiments the system 100 stores the category in association with the transaction. In an embodiment, the system stores the category in association with the transaction in a categorization database, as further discussed with respect to FIG. 7. In one embodiment, the system stores the category in a transaction history of the user. For example, the transaction record of the user may include the amount, the date, the location, and the category or categories associated with a transaction. In some embodiments, the systems stores the category in budgeting system provided to the user. In a still further embodiment, the system updates a budgeting system or bill pay system with the categories and associated transactions.

Referring now to FIG. 2, a system and method 200 for prompting categorization during payment authorization is provided in accordance with various embodiments of the invention. In some embodiments, the one or more steps of the system and method 200 are performed by a banking system, a POS device, and/or the system 100. As with all methods disclosed herein, it should be understood that in some embodiments the order of the steps may vary and certain steps may not be performed.

As illustrated in block 202, the system 200 receives an authorization request for a transaction being conducted by a user. In an embodiment, the system receives the authorization request from a merchant where the user is conducting the transaction. For example, the user may be checking out a grocery store and provides a payment method to at the point-of-transaction device to complete the transaction. The point-of-transaction device sends an authorization request to the financial institution to determine whether the transaction is authorized. For example, the merchant may be determining whether sufficient funds are available and whether the user is an authorized user. The authorization request may be sent to the system over a network, such as a wired or wireless network. In an exemplary embodiment, the authorization request occurs over standard networks for authorizing transactions.

In one embodiment, initiation of a transaction is an authorization request. For example, the user may bring a group of products to a point-of-sale and initiate the transaction. As will be described later, the user may wirelessly connect the user's mobile device to the point-of-sale device such that as products are scanned at the point-of-sale, the product and, in some cases, a suggested category is displayed on the user's mobile device. Thus, the authorization request is not necessarily the communication between the merchant and the financial institution but can also be the initiation of the transaction before the communication between the merchant and the financial institution is started.

In a further embodiment, the system receives the authorization request from the user. For example, the user may be conducting a transaction using a mobile device, such as a person-to-person or person-to-merchant transaction. In this embodiment, the authorization request may be received by the system over a network such as a telephone, wireless or Wi-Fi network.

As illustrated in block 204, the system 200 prompts the user to categorize at least one component of the transaction. In this embodiment, the system sends a request to the user to provide at least one category for the transaction. In an exemplary embodiment, the system prompts the user to categorize at least one component of the transaction before authorizing the transaction. In one embodiment, the system requires that the user categorize at least one component of the transaction prior to authorizing the transaction, i.e., the user must categorize at least one component of the transaction for the transaction to be authorized. In another embodiment, the user is provided the opportunity to categorize at least one component of the transaction prior to authorizing the transaction, but categorization is not necessary for authorization.

In an embodiment, prompting the user to categorize at least one component of the transaction comprises displaying the transaction on a screen, such as a screen associated with the user's mobile device, and prompting the user to associate a category or categories with the transaction. In a further embodiment, prompting the user to categorize at least one component of the transaction comprises sending a message to the user, such as an email or a text message, that the user can reply to in order to categorize at least one component of the transaction.

As discussed, in some embodiments, a point-of-sale device and a mobile device of the user wirelessly connects to provide real-time display of products or services that are being purchased in the transaction. When this occurs, the product or service may be displayed on the user device such that the user has the option to categorize the products or services associated with the transaction. In some embodiments, the system provides categories based on the SKU or barcode associated with the product or service and identified by the point-of-sale device. The system may also provide categories during the real-time display in any of the other ways disclosed herein, such as based on the user's location, the identity of the merchant, the amount of the transaction, the time or date of the transaction, or the like. In some embodiments, the user does not have to actively categorize transactions during the real-time display of the items. For example, the user may indicate that default categories, such as those based on the SKU, should be used to categorize the product or service unless the user intervenes and instructs the system otherwise. In this manner, the user is able to review the mobile device to evaluate the categories that are being assigned to the products or services in the transaction and only actively categorizes the product or service when the system incorrectly categorizes the product. For example, if the incorrect bar code is applied to the product or if the user is purchasing the product for a reason different from the generally-accepted category (e.g., if the user is purchasing something as a gift that would normally be categorized in the "electronics" category).

In an embodiment, the system determines whether the transaction meets predefined criteria for when the system will prompt the user to categorize at least one component of the transaction. For example, in some embodiments, the system may prompt the user to categorize at least one component of the transaction if the transaction is above a predetermined amount of money. In other embodiments, the predefined criteria may be a time of day, a day of the week, a merchant, or a location. For example, the system may prompt for categorization when the user is conducting a transaction between 9 am and 5 pm from Monday to Friday in order that the user may capture business expenses made during the work week. In another example, the system determines that the user is conducting a transaction at a specific type of merchant and therefore prompts the user to categorize at least one component of the transaction. The user may be prompted to categorize the various components of a single transaction being conducted at a grocery store. In a still further example, the system may determine the location of the user, such as via a geopositioning device of the mobile device of the user, and prompt the user to categorize at least one component of the transaction based on the location of the user. For example, the user may set predefined criteria in the system to prompt for categorization when the user is outside of the user's home state. In this manner, the user may better be able to track expenses while traveling. It should be understood that the disclosed predefined criteria are merely examples and that other criteria may be used. For example, the frequency of the transaction at a specific merchant may be used to prompt the user for categorization, i.e., if the user conducts a second transaction at a merchant more quickly than the user's transaction history would predict, then the user may be prompted to categorize the transaction.

In some embodiments, the system suggests categories for at least one component of the transaction. As will be discussed in greater detail with respect to FIG. 3, the system may suggest categories based on the location of the user. For example, the system may track the user's location, determine that the user is proximate to (e.g., within or next to) a merchant, identify the merchant, and suggest categories based on the products and/or services that the merchant provides. In another embodiment, the system suggests categories for at least one component of the transaction based on another characteristic of the transaction. For example, the system may suggest categories based on the time of day, the day of the week, the week of the year, special holidays, the amount of the transaction, or any other characteristic of the transaction. In one example, the system may suggest categories associated with breakfast when the user is conducting a transaction between 6 and 8 am. In another example, the system may suggest categories associated with gifts when the user is conducting a transaction the day after Thanksgiving. In a still further example, the system determines a category or categories most likely to be associated with the transaction based on an analysis of the user's transaction and categorization history and then suggests the most likely categories for the user based on this analysis. For example, the system may determine that a transaction that is for less than $5.00 will most likely be categorized as "eating out" based on the transaction and categorization history of the user. It should be understood that multiple suggestions may be made and that multiple characteristics of the transaction can be used to determine when or how the system will suggest categories for at least one component of the transaction.

As illustrated in block 206, the system 200 receives a category from the user for the at least one component of the transaction. In an embodiment, the system receives the category from the user based on input from the user. The user may type on a screen or keyboard, speak into a microphone, or select icons on a screen indicating categories. In an embodiment, the user provides the input using the user's mobile device.

As illustrated in block 208, the system 200 stores the category in association with the transaction. In an embodiment, the system stores the category in association with the transaction in a categorization database, as further discussed with respect to FIG. 7. In one embodiment, the system stores the category in a transaction history of the user. For example, the transaction record of the user may include the amount, the date, the location, and the category or categories associated with a transaction. In some embodiments, the systems stores the category in budgeting system provided to the user. In a still further embodiment, the system updates a budgeting system or bill pay system with the categories and associated transactions.

As illustrated in block 210, the system 200 authorizes the transaction. In some embodiments, the system is integrated with the transaction authorization system. As discussed, in some embodiments, the system requires categorization of at least one component of the transaction before the system will authorize the transaction. In a further embodiment, the system requires categorization of all components of the transaction before the system will authorize the transaction.

Turning now to FIG. 3, a system and method 300 for providing suggested transaction categories based on location is provided in accordance with various embodiments of the invention. As with other systems and methods disclosed herein, the system 300 may be integrated within a banking system. In block 302, the system 300 determines a location of a user. In one embodiment, the user must opt in to being tracked by the system before the system will do so. In an embodiment, the system determines the location of the user based on triangulation. For example, a communication device associated with the mobile device may connect to at least one transmitter of a wireless signal. The processor determines the distance from the transmitter and triangulates the location of the user in the business. Any type of wireless signal may be used. In one embodiment, GPS signals captured by the user's mobile device are used. In an exemplary embodiment, Wi-Fi signals are used to determine the location of the user. For example, the strength of the Wi-Fi signal may be used to determine the distance from a Wi-Fi transmitter. Alternatively, communication time between the Wi-Fi transmitter and the mobile device may also be calculated. When distance from at least three known locations is provided, algorithms to determine the location of a user are known.

In a further embodiment, the system determines the location of the user based on proximity to pre-set markers. In some embodiments, pre-set markers are established throughout a merchant. For example, markers may be established at the front and end of every aisle. Markers may be placed regularly throughout the store, such as at set distances along each aisle (e.g., every five feet down an aisle) so that the user is usually or always in proximity to a marker. In some embodiments, the pre-set markers are established in a regular pattern, such as a grid. In other embodiments, however, the pre-set markers are established in a non-regular pattern. The pre-set markers may be randomly placed throughout the business or placed in key locations, such as at the front of the bakery or at a cash register. Using pre-set markers, the mobile device is configured to determine the user's location based on the pre-set marker. The mobile device may identify the nearest pre-set marker or a plurality of pre-set markers to identify the user's location. The pre-set markers may emit a signal, such as from an RFID tag, an NFC-enabled chip, or other signal that can be detected by the mobile device.

In some embodiments, the system determines the location of the user based on the user's original location and velocity data associated with the user and/or the mobile device. For example, the system may track the user using GPS while the user is outside the business and receiving satellite signals. When the user enters the business, the system evaluates the current location of the user (e.g., the entry point) and tracks the user's velocity (speed and direction) to continually determine the user's location. In some embodiments, a sensor, such as an RFID or NFC sensor, detects the user's passage and thereby determines the user's initial location. The user may contact the sensor with the mobile device or the user may merely pass by the sensor and be identified. In an embodiment, a curtain or arch defines an opening to a business and senses all individuals that pass through the curtain. The sensor communicates with the user's mobile device and thereby determines the user's initial location. When the user's initial location is known, an accelerometer, magnetometer, or other device can be used to determine the user's velocity, i.e., speed and direction. By knowing the user's initial location and tracking the user's velocity based on the mobile device, the system can accurately determine the user's current location.

In yet further embodiments, the system determines the location of the user based on video tracking of the user by the business. In some embodiments, the business operates video cameras having tagging or user matching software. The business tracks users via the video camera and, in some embodiments, transmits the location information to the user. In an embodiment, individuals opt-in to tracking and, when the individual enters the business, the video camera identifies the individual and tracks the individual through the video camera. The video camera can identify the individual in a variety of ways, such as using facial recognition or detecting a signal produced by the mobile device. It should be understood that any or all of these methods of determining the location of the user may be combined with one another. For example, users can be initially identified in a video camera based on proximity to pre-set markers.

In block 304, the system 300 accesses a database comprising a plurality of locations and associated transaction categories. In an embodiment, the database is the categorization database disclosed in FIG. 7. In some embodiments, the system uses the location of the user determined in block 302 and identifies categories associated with the location. For example, the system may determine that the user is located at a merchant at a specific address. The system looks up the address in the categorization database and identifies categories that have been associated with the address. The categories may be associated with the location based on user input, merchant input, third party database, or financial institution defaults. For example, the categorization database may receive input from users that are using the systems disclosed herein. As the user provides an input and category for a product or location, the system may determine the user's location and store the location and associated category in the database. In this way, the system learns which categories other users or the specific user is categorizing at a specific location and can improve recommendations for the location. In another example, the merchant may provide a list of categories for products and services it sells to the system for inclusion in the database. Still further, financial institutions may provide default categories for merchants or locations based on generalized information about the merchant or location. In an embodiment, the financial institution may provide a default list of categories for merchants based on keywords or codes associated with types of merchants, e.g., restaurants, grocery stores, or drugstores.

In block 306, the system 300 determines at least one category associated with the location using the database. After accessing the database comprising the plurality of locations and associated transaction categories, the system determines at least one category associated with the location. In an embodiment, the system determines the category prior to the user completing a transaction at the location. The system may also determine the category after the user completes the transaction. The category determined by the system may be the only category associated with the location. In another embodiment, however, multiple categories may be determined. For example, all of the categories associated with the location may be determined by the system.

In an embodiment, the category determination is made based at least in part on the location of the user. For example, the category may be a characterization of the product or service offered by a merchant at the location. In some embodiments, the category determination is made based on a combination of the location and a characteristic of the location or transaction. For example, the time that the user has come into proximate location of a merchant can be included in the analysis such that both the location and the time of day that the user is at the location can be used to determine a category. A user conducting a transaction at a gas station may be more likely to be purchasing coffee if the user is at the gas station in the morning; thus, the system will determine the category or categories associated with the location based on the combination of the location and the time the user is at the location. In another embodiment, the system determines the category based on a combination of the location and the amount.

In further embodiments, the system compares the characteristic of the current transaction to the characteristics of previous transactions in order to model which categories are most likely for the current transaction. For example, the system may determine that transactions being conducted on a Saturday or Sunday at a given location will most likely be a first category, based on the frequency with which the relationship is recorded in the categorization database by other users, but that a transaction conducted at the given location on a weekday are likely to be in a second category based on the categorization database.

In block 308, the system 300 provides the at least one category to the user so that the user may categorize the transaction. In an embodiment, after the system determines the at least one category associated with the location, the system provides the at least one category to the user to assist the user in categorizing the transaction. In this manner, the user is provided a category for a prospective, current, or recently conducted transaction at the location. The category may be provided to the user through a mobile device, such as via an application on a mobile device, or through a message, such as an email or text message. In an exemplary embodiment, the system provides the category to the user when the user is conducting the category. The system may determine that the user is conducting a transaction as previously discussed or may receive input from the user, such as selection of an icon in an application, indicating that the user is conducting a transaction.

In some embodiments, the suggested categories are provided to the user after the transaction. For example, the suggested categories may be provided to the user immediately after the transaction completes. The user may desire to not be bothered with categorizing products or services while completing the transaction but would like to be reminded to categorize all or some of the transaction soon after the transaction completed. In another embodiment, the system provides the suggested categories to the user in coordination with an e-receipt, such as an emailed receipt of the transaction along with the suggested categories. In a further embodiment, the e-receipt allows the user to automatically or one-by-one accept or change the suggested categories. In a still further embodiment, the system provides the suggested categories to the user upon the user's request, such as when the user accesses the user's online banking portal.

In block 310, the system 300 receives input from the user selecting a category from the at least one category provided to the user. In an embodiment, the user uses a mobile device to provide an input to the system regarding whether the user accepts the provided category, wants to apply the provided category to the transaction, or whether the user would like to reject the provided category and select an alternative category. In an embodiment, the user input is provided to the categorization database to provide suggestions for the user or for other users. In some embodiments, the mobile device has multiple input devices for receiving input from the user. For example, the mobile device may include a camera, a touch pad or keyboard, a microphone, a positioning system device, or other input devices that allow users to input information, either directly or indirectly, and provide information on whether the user accepts the provided category or wishes to determine another category.

In block 312, the system 300 stores the selected category in association with the transaction. In an embodiment, the system stores the category in association with the transaction in a categorization database, as further discussed with respect to FIG. 7. In one embodiment, the system stores the category in a transaction history of the user. For example, the transaction record of the user may include the amount, the date, the location, and the category or categories associated with a transaction. In some embodiments, the systems stores the category in budgeting system provided to the user. In a still further embodiment, the system updates a budgeting system or bill pay system with the categories and associated transactions. In still further embodiments, the transaction and/or category, and in some embodiments, the location is published via social media. Still further, the user may be provided with a notification of recent transactions and categories. For example the user may be emailed a history of the user's transactions, locations, and categories.

In a further embodiment, the user is provided with a summary of transaction and categorization information. For example, the user may be provided with the summary at the end of every day, every week, every month, or every year. In an embodiment, the user is provided the summary upon the user's request or on a user-defined timeline. In some embodiments, triggering activities result in the user being provided a summary. For example, when the user's account balance reaches a predefined level or when certain categories are used. In some embodiments, the review includes all transactions and associated categories, but in another embodiment the summary includes only a subset of the transactions and categorization information. For example, the subset may be based on the transaction amount, e.g., if it is about a pre-defined level, a specific category, a specific location, or a specific merchant.

FIG. 4 provides a block diagram illustrating a transaction categorization system and environment 400, in accordance with an embodiment of the invention. As illustrated in FIG. 4, the transaction categorization environment 400 includes a user 402 and a mobile device 500. The mobile device will be discussed in greater detail with respect to FIG. 5. A user of the system may be a person, but may also be a merchant 440 (e.g., a business), customer of a merchant, or any other entity capable of making purchases or payments. Merchants 440 conduct transactions with users 402 at point-of-sale devices 442, which may be cash registers, mobile devices, self-payment kiosks (e.g., mass transit purchases, payment for parking), or the like. The merchant may be a brick-and-mortar merchant, a mobile merchant, or an online merchant.

As used herein, a mobile device 500 is any mobile communication device, such as a cellular telecommunications device (i.e., a cell phone or mobile phone), personal digital assistant (PDA), a mobile Internet accessing device, or other mobile device. Still further, the user 402 may conduct a transaction at a non-merchant, such as at an Automated Teller Machine (ATM).

The environment also includes at least one financial institution banking system 600 and categorization database 700. In some embodiments, the banking system 600 includes authentication of the user 402 in order to access the user's account on the banking system 600. For example, the banking system 600 may be a system where the user 402 logs into his/her account such that the user 402 or other entity can access data that is associated with the user 402. For example, in one embodiment of the invention, the banking system 600 is a mobile banking system maintained by a financial institution. In such an embodiment, the user 402 can log into the mobile banking system to access the user's financial accounts and in some cases the categorization database 700. Logging into the banking system 600 generally requires that the user 402 authenticate his/her identity using a user name, a passcode, a cookie, a biometric identifier, a private key, a token, and/or another authentication mechanism that is provided by the user 402 to the banking system 600.

In some embodiments, the banking system comprises a third party system. For example, the banking system may include a partner, vendor, or other third party that processes payments and that is separate from a financial institution or POS device. The banking system may, for example, be a part of an online banking system or otherwise associated with the online banking system.

The financial institution's banking system 600 is in network communication with other devices, such as other financial institutions' banking systems (not shown), a mobile device 500, a point of sale device 442, and a categorization database 700. The network 450 may include a local area network (LAN), a wide area network (WAN), and/or a global area network (GAN). The network 450 may provide for wireline, wireless, or a combination of wireline and wireless communication between devices in the network. In one embodiment, the network 450 includes the Internet. In one embodiment, the network 450 includes a wireless telephone mobile network (not shown). In a further embodiment, the network 450 includes a near field communication (NFC) network.

The categorization database 700 may be a part of the financial institution banking system 600 or may be separate from the banking system 600. In some embodiments of the invention, the categorization database 700 is configured to be controlled and managed by one or more third-party data providers (not shown in FIG. 4) over the network 450. In other embodiments, the categorization database 700 is configured to be controlled and managed over the network 450 by the same entity that maintains the financial institution's banking system 600. The categorization database 700 may be a portion of a server configured to store information for a single entity, such as a person or a business. The information may include the merchant name, location, products and services, categories, and the like. The financial institution banking system 600 and the categorization database 700 are described in greater detail below with reference to FIGS. 6 and 7, respectively.

FIG. 5 illustrates an embodiment of a mobile device 500 that may be configured to operate in coordination with the disclosed transaction categorization system and method. In an embodiment, a "mobile device" 500 is any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like. The device 500 may also be stationary, such as a desktop computer, ATM, merchant kiosk (e.g., at the point of sale), or financial institution kiosk, and provide access to the transaction categorization functionality via the network 450.

The device 500 may generally include a processor 510 communicably coupled to such components as a memory 520, user output devices 536, user input devices 540, a network interface 560, a power source 515, a clock or other timer 550, a camera 570, at least one positioning system device 575, one or more transaction categorization systems 590, and the like. The processor 510, and other processors described herein, may generally include circuitry for implementing communication and/or logic functions of the device 500. For example, the processor 510 may include a digital signal processor device, a microprocessor device, and various analog to digital converters, digital to analog converters, and/or other support circuits. Control and signal processing functions of the device 500 may be allocated between these devices according to their respective capabilities. The processor 510 thus may also include the functionality to encode and interleave messages and data prior to modulation and transmission. The processor 510 may additionally include an internal data modem. Further, the processor 510 may include functionality to operate one or more software programs or applications, which may be stored in the memory 520. For example, the processor 510 may be capable of operating a connectivity program, such as a web browser application 522. The web browser application 522 may then allow the device 500 to transmit and receive web content, such as, for example, location-based content and/or other web page content, according to a Wireless Application Protocol (WAP), Hypertext Transfer Protocol (HTTP), and/or the like.

In some embodiments, the positioning system device 575 is configured to determine the location of the device. For example, at least one of the positioning system devices 575 may interact with the transceiver to send and/or receive information with wireless transmitters, such as GPS or Wi-Fi. In further embodiments, the positioning system device 575 is configured to determine movement and/or orientation of the mobile device. Accelerometers, magnetometers, and other devices can be included in the mobile device to provide information to the device on the location and velocity (speed and direction) of the device. Other types of positioning system devices 575 may be included in the device without limitation. For example, altimeters can be included in the device to determine the elevation of the device. Similarly, electronic or standard compasses may be included.

The processor 510 may also be capable of operating applications, such as a categorization application 521. The categorization application 521 may be downloaded from a server and stored in the memory 520 of the device 500. Alternatively, the categorization application 521 may be pre-installed and stored in a memory of the transaction categorization system 590 or activated directly from a website operably linked to the device 500 through the network interface 560. In embodiments where the categorization application 521 is pre-installed or run from a website, the user may not download the categorization application 521 from a server. The transaction categorization system 590 may also include a user data storage 571 which may permanently or temporarily store data relating to the user in a local memory on the device 500.

FIG. 6 provides a block diagram illustrating the financial institution banking system 600 in greater detail, in accordance with embodiments of the invention. As illustrated in FIG. 6, in one embodiment of the invention, the banking system 600 includes a processing device 620 operatively coupled to a network communication interface 610 and a memory device 650. In certain embodiments, the banking system 600 is operated by a first entity, such as a financial institution, while in other embodiments the banking system 600 is operated by an entity other than a financial institution.

As used herein, a "processing device," such as the processing device 620, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 620 may further include functionality to operate one or more software programs based on computer-executable program code thereof, which may be stored in a memory. As the phrase is used herein, a processing device 620 may be "configured to" perform a certain function in a variety of ways, including, for example, by having one or more general-purpose circuits perform the function by executing particular computer-executable program code embodied in computer-readable medium, and/or by having one or more application-specific circuits perform the function.

The network communications interface 610 is a communication interface having one or more communication devices configured to communicate with one or more other devices on the network 450, such as the mobile device 500, the point-of-sale device 442, the other financial institution banking systems (not shown), and the categorization database 700. The processing device 620 is configured to use the network communication interface 610 to transmit and/or receive data and/or commands to and/or from the other devices connected to the network 450. As used herein, a "communication interface" generally includes a modem, server, transceiver, and/or other device for communicating with other devices on a network, and/or a user interface for communicating with one or more users.

It should be understood that the memory device 650 may include one or more databases or other data structures/repositories. The memory device 650 also includes computer-executable program code that instructs the processing device 620 to operate the network communication interface 610 to perform certain communication functions of the banking system 600 described herein. For example, in one embodiment of the banking system 600, the memory device 650 includes, but is not limited to, a network server application 670, an authentication application 660, a user account data repository 680, which includes user authentication data 682 and user account information 684, a banking application 690, which includes a categorization database interface 692, and other computer-executable instructions or other data.

The authentication application 660 determines whether an entity that is logging into the financial institution banking system 600 is permitted to access the banking system 600. Entities such as individuals, businesses, and employees of businesses may provide authentication credentials to the banking system 600, which are stored in the user authentication data 682 database. When the entity attempts to access the banking system 600, such as when the entity is attempting to categorize a part of a transaction, in some embodiments the entity uses a user interface to input authentication information and this information is compared to the data stored in the user authentication data 682 to determine whether the entity is permitted to access the banking system. As used herein, a "user interface" generally includes a plurality of interface devices that allow a customer to input commands and data to direct the processing device to execute instructions. These input and output devices may include a display, mouse, keyboard, button, touchpad, touch screen, microphone, speaker, LED, light, joystick, switch, buzzer, bell, and/or other customer input/output device for communicating with one or more entities.

The network server application 670 provides functionality that allows the system to communicate over the network 450. In an embodiment, the network server application 670 utilizes the network communication interface to communicate with other devices on the network 450.

The user account data repository 680 stores user information, such as user authentication data 682 and user account information 684. The user account information may comprise a transaction history, frequently used categories, frequently visited locations, saved categorizations, and so on.

The banking application 690 processes transactions for the user and in some embodiments stores the user selected category with the transaction record at the financial institution. The banking application 690 may also include a categorization database interface 692. The categorization database interface 692 facilitates communication between the banking system 600 and the categorization database 700.

FIG. 7 provides a block diagram illustrating a categorization database 700, in accordance with an embodiment of the invention. In one embodiment of the invention, the categorization database 700 is operated by a second entity that is a different or separate entity from the first entity (e.g., the financial institution) that, in one embodiment of the invention, implements the banking system 600. In one embodiment, the categorization database 700 could be part of the banking system 600. In another embodiment, the categorization database 700 is a distinct entity from the banking system 600.

As illustrated in FIG. 7, the categorization database 700 generally includes, but is not limited to, a network communication interface 710, a processing device 720, and a memory device 750. The processing device 720 is operatively coupled to the network communication interface 710 and the memory device 750. In one embodiment of the categorization database 700, the memory device 750 stores, but is not limited to, a banking system interface 760, a transaction analysis application 770, and a categorization data store 780. The transaction analysis application 770 analyzes transactions, such as the location of the transaction, the amount of the transaction, the user-provided or system-determined category for the transaction, and the like. In some embodiments, the transaction analysis application 770 determines the location associated with the user and provides a list of suggested categories for categorizing at least a part of the transaction. For example, the transaction analysis application may determine that the user is at a gas station based on the user's location and maps stored in the memory device 750, and then determine based on the user's previous transaction at this specific gas station, based on other user's transactions at this gas station, or based on generalizations regarding user behavior, that the user will be conducting a transaction in one of three categories. The system can then provide those categories to the user when the user conducts a transaction proximate in time and/or location to the gas station to assist the user in categorizing all or a portion of the transaction.

The categorization data store 780 stores data including, but not limited to, the transaction data for the user and for other users, which may be anonymized, the relationship between locations and categories, frequency histograms for categorization events associated with locations, and relationship data between correlated products or services. Correlated products or services are products or services that are often categorized together in a single transaction.

The network communication interface 710 is a communication interface having one or more communication devices configured to communicate with one or more other devices on the network 450. The processing device 720 is configured to use the network communication interface 710 to receive information from and/or provide information and commands to a other devices via the network 450. In some embodiments, the processing device 720 also uses the network communication interface 710 to access other devices on the network 450, such as one or more web servers of one or more third-party data providers As described above, the processing device 720 is configured to use the network communication interface 710 to gather data from the various data sources. The processing device 720 stores the data that it receives in the memory device 750. In this regard, in one embodiment of the invention, the memory device 750 includes data stores that include, for example: (1) location information; (2) algorithms for determining a category associated with the location and in some situations other characteristics of the location, user, merchant, or transaction (3); transaction and categorization data for the user; (4) demographic data for the user; and/or (5) transaction history data for the user.

Turning now to FIG. 8, a mixed block and flow diagram for providing transaction categorization is disclosed, in accordance with an embodiment of the invention. The mixed block and flow diagram discloses how the various methods disclosed in FIGS. 1-3 may interact. It should be understood that the steps or features disclosed in FIGS. 1-3 may be implemented, as disclosed in FIG. 8.

In block 802, the user enters or associates with a merchant. As discussed, users and merchants are to be construed broadly here. A user may be an individual or a family. A merchant may be a for-profit business, a non-profit organization, a government entity or the like.

In decision block 804, the system determines whether the user has enrolled in tracking. The user may opt in to allow the system to track the user's movement based on a mobile device. In some embodiments, the user provides limitations for when or where the user may be tracked using the geopositioning devices associated with the mobile device.

In block 806, if the user has enrolled in tracking then the system determines a location of the user and/or a transaction being conducted by the user. In an embodiment, the system determines the location of the user based on triangulation. In one embodiment, GPS signals captured by the user's mobile device are used. In an exemplary embodiment, Wi-Fi signals are used to determine the location of the user. In a further embodiment, the system determines the location of the user based on proximity to pre-set markers. In some embodiments, the system determines the location of the user based on the user's original location and velocity data associated with the user and/or the mobile device.

In block 808, the system accesses a database comprising locations and associated transaction categories. In an embodiment, the database is the categorization database disclosed in FIG. 7. In some embodiments, the system identifies categories associated with the user's location. The system looks up the address in the categorization database and identifies categories that have been associated with the address. The categories may be associated with the location based on user input, merchant input, third party database, or financial institution defaults. In an embodiment, the financial institution may provide a default list of categories for merchants based on keywords or codes associated with types of merchants, e.g., restaurants, grocery stores, or drugstores.

In block 810, the system determines at least one category associated with the location. In an embodiment, the system determines the category prior to the user completing a transaction at the location. The system may also determine the category after the user completes the transaction. In an embodiment, the category determination is made based at least in part on the location of the user. For example, the category may be a characterization of the product or service offered by a merchant at the location. In some embodiments, the category determination is made based on a combination of the location and a characteristic of the location or transaction. In further embodiments, the system compares the characteristic of the current transaction to the characteristics of previous transactions in order to model which categories are most likely for the current transaction. In a further embodiment, the system determines the at least one category based on the location of the user and based on user input, wherein the user input is a product or service that the user associates with a future transaction. For example, in some situations people purchase items within the same or a related category at the same time. When a person shops at a grocery store, they may be buying all grocery items. If the user scans one item to provide an input, the system may, based on the location and the input of the scanned grocery item, determine additional categories associated with grocery stores.

In block 812, the system provides the at least one category associated with the location to the user. In an embodiment, after the system determines the at least one category associated with the location, the system provides the at least one category to the user to assist the user in categorizing the transaction. In this manner, the user is provided a category for a prospective, current, or recently conducted transaction at the location. The category may be provided to the user through a mobile device, such as via an application on a mobile device, or through a message, such as an email or text message. In an exemplary embodiment, the system provides the category to the user when the user is conducting the category. The system may determine that the user is conducting a transaction as previously discussed or may receive input from the user, such as selection of an icon in an application, indicating that the user is conducting a transaction.

In block 814, if the user has not enrolled in tracking then in some embodiments the system will be inactive until the user provides an input associated with a component of a future transaction.

In block 816, the system determines a product, service, and/or category based on the user input. In some embodiments, the user scans the product using a camera on the mobile device. In some embodiments, scanning of the bar code may provide additional information, such as the cost of the item, the last time that the item was purchased by the user, competitive prices for the item at other retailers, and other information regarding the item. In an embodiment, the user takes a picture or video of the product and object identification software identifies the product. In an embodiment, the system aggregates images from various users as well as products and/or categories provided by users, merchants, or suppliers, and then uses these images as reference images for comparison to input from the user. In a further embodiment, the user types in the name of the product. In a further embodiment, the user provides an input to the system by speaking into a microphone associated with a mobile device As illustrated at block 106, in some embodiments the system 100 determines a category associated with the product or service. As discussed, in some embodiments the system determines the category associated with the product or service based on the input from the user. In another embodiment, the user verbally inputs the category as the input, for example, speaking the word "coffee" into the mobile device when entering a coffee shop. In a further embodiment, the system determines the category associated with the product or service. In some embodiments, however, this automatic categorization may be superseded by user input. In an embodiment, a category is associated with a product or service if the category represents a need or a want for the user that the product or service meets In block 818, the user initiates a transaction at a merchant. In an embodiment, the system determines that the user initiated a transaction as a merchant by receiving data associated with the transaction at a point-of-transaction device. In an embodiment, the system receives the data over a network, such as a transaction processing network or wireless network. The data may be encrypted for security. In some embodiments, the data include financial account information or a proxy for financial account information. For example, the data may include the name and/or financial account number of a first party, e.g., a payor, to the transaction and an account number and/or financial account number of a second party, e.g., a payee. The data may further include the amount of the transaction, the time and date of the transaction, the location of the transaction, a category of the transaction, or other information.

In block 820, the system receives an authorization request for the transaction. In an embodiment, the system receives the authorization request from a merchant where the user is conducting the transaction. The authorization request may be sent to the system over a network, such as a wired or wireless network. In an exemplary embodiment, the authorization request occurs over standard networks for authorizing transactions.

In block 822, the system associates the previously-input category with the transaction. In some embodiments, the system stores the category in association with the transaction. In an embodiment, the system stores the category in association with the transaction in a categorization database, as further discussed with respect to FIG. 7. In one embodiment, the system stores the category in a transaction history of the user.

In block 824, the system prompts the user to categorize at least one component of the transaction. In this embodiment, the system sends a request to the user to provide at least one category for the transaction. In an exemplary embodiment, the system prompts the user to categorize at least one component of the transaction before authorizing the transaction. In one embodiment, the system requires that the user categorize at least one component of the transaction prior to authorizing the transaction, i.e., the user must categorize at least one component of the transaction for the transaction to be authorized. In another embodiment, the user is provided the opportunity to categorize at least one component of the transaction prior to authorizing the transaction, but categorization is not necessary for authorization.

In block 826, the user provides a category for at least one component of the transaction. The user may type on a screen or keyboard, speak into a microphone, or select icons on a screen indicating categories. In an embodiment, the user provides the input using the user's mobile device.

In block 828, the system receives the category for the at least one component of the transaction from the user. In an embodiment, the system receives the category from the user based on input from the user.

In block 830, the system stores the category in association with the transaction. In an embodiment, the system stores the category in association with the transaction in a categorization database, as further discussed with respect to FIG. 7. In one embodiment, the system stores the category in a transaction history of the user. In some embodiments, the systems stores the category in budgeting system provided to the user. In a still further embodiment, the system updates a budgeting system or bill pay system with the categories and associated transactions.

In block 832, the system authorizes the transaction. In some embodiments, the system is integrated with the transaction authorization system. As discussed, in some embodiments, the system requires categorization of at least one component of the transaction before the system will authorize the transaction. In a further embodiment, the system requires categorization of all components of the transaction before the system will authorize the transaction.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for prompting categorization during payment authorization of a transaction being conducted by a user, the system comprising:
    a computer apparatus including a processor and a memory;
    one or more proximity marker devices located inside a facility, the one or more proximity marker devices being configured to transmit a wireless proximity signal; and
    a software module stored in the memory, comprising executable instructions that when executed by the processor cause the processor to:
        track the user's location using GPS coordinates provided by the mobile device when the user is located outside the facility;
        transmit the wireless proximity signal using the one or more proximity marker devices, wherein the wireless proximity signal is configured to be received by a positioning system device of the mobile device;
        determine the user's location when the user is located inside the facility based on receiving a response signal from the user mobile device indicating receipt of the wireless proximity signal of the one or more proximity marker devices;
        access a categorization database;
        determine a time of day;
        using the categorization database, determine that the user's location is associated with a plurality of categories for the determined time of day, wherein the plurality of categories are determined based on at least the response signal from the user mobile device;
        suggest the plurality of categories based on the user's location and the determined time of day;
        prompt the user to categorize at least one component of the transaction;
        receive a category from the user for the at least one component of the transaction;
        receive instructions, from the mobile device, to process the transaction and associate the received category with the at least one component of the transaction;
        in response to the instructions from the mobile device, initiate storing the category in association with the at least one component of the transaction in a categorization database; and
        in response to the instructions from the mobile device, process the transaction.

2. The system of claim 1, wherein the module is further configured to authorize the transaction when the user categorizes at least one component of the transaction.

3. The system of claim 1, wherein the module is further configured to:
determine whether the transaction meets predefined criteria, wherein the predefined criteria comprise an amount, a time, a merchant, and a location; and
prompt the user to categorize at least one component of the transaction when the transaction meets the predefined criteria.

4. The system of claim 1, wherein the module is further configured to:
access a database comprising a plurality of merchants and associated categories; and
suggest categories based on the most frequently associated categories relating to the merchant.

5. The system of claim 1, wherein the user is prompted to categorize the transaction using a mobile device and the system receives the category from the user via the mobile device.

6. The system of claim 5, wherein the mobile device receives a verbal input from the user providing the category.

7. The system of claim 1, wherein the one or more proximity marker devices comprise a Wi-Fi transmitter configured to transmit the wireless proximity signal comprising a Wi-Fi signal, wherein the user's location is determined based on a signal strength of the Wi-Fi signal received at the mobile device.

8. The system of claim 1, wherein the one or more proximity marker devices comprise a NFC-enabled chip configured to transmit the wireless proximity signal comprising a NFC signal.

9. The system of claim 1, wherein the one or more proximity marker devices comprise a RFID tag configured to transmit the wireless proximity signal comprising a RFID signal.

10. The system of claim 1, wherein the one or more proximity marker devices are positioned inside the facility such that the user is always in proximity of at least one proximity marker signal.

11. The system of claim 1, wherein
wherein the category from the user for the at least one component is received at a first user location;
wherein the instructions to process the transaction from the mobile device are received at a second user location; and
wherein the transaction is processed based on at least determining that the distance between the first user location and the second user location is less than a predetermined distance.

12. The system of claim 1, wherein
wherein the category from the user for the at least one component is received at a first time of day;
wherein the instructions to process the transaction from the mobile device are received at a second time of day; and
wherein the transaction is processed based on at least determining that the difference between the first time of day and the second time of day is less than a predetermined duration.

13. A computer program product for prompting categorization during payment authorization of a transaction being conducted by a user, the computer program product comprising:

a non-transitory computer readable storage medium having computer readable program code embodied therewith, the computer readable program code comprising:
a computer readable program code configured to track the user's location using GPS coordinates provided by the mobile device when the user is located outside a facility;
a computer readable program code configured to transmit a wireless proximity signal using one or more proximity marker devices, wherein:
the one or more proximity marker devices are located inside the facility, the one or more proximity marker devices being configured to transmit the wireless proximity signal; and
the wireless proximity signal is configured to be received by a positioning system device of the mobile device;
a computer readable program code configured to determine the user's location when the user is located inside the facility based on receiving a response signal from the user mobile device indicating receipt of the wireless proximity signal of the one or more proximity marker devices;
a computer readable program code configured to access a categorization database;
a computer readable program code configured to determine a time of day;
a computer readable program code configured to, using the categorization database, determine that the user's location is associated with a plurality of categories for the determined time of day, wherein the plurality of categories are determined based on at least the response signal from the user mobile device;
a computer readable program code configured to suggest the plurality of categories based on the user's location and the determined time of day;
a computer readable program code configured to prompt the user to categorize at least one component of the transaction;
a computer readable program code configured to receive a category from the user for the at least one component of the transaction;
a computer readable program code configured to receive instructions, from the mobile device, to process the transaction and associate the received category with the at least one component of the transaction;
a computer readable program code configured to, in response to the instructions from the mobile device, initiate storing the category in association with the at least one component of the transaction in a categorization database; and
a computer readable program code configured to, in response to the instructions from the mobile device, process the transaction.

14. The computer program product of claim 13, the computer program product further comprising a computer readable program code configured to authorize the transaction when the user categorizes at least one component of the transaction.

15. The computer program product of claim 13, the computer program product further comprising a computer readable program code configured to:
determine whether the transaction meets predefined criteria, wherein the predefined criteria comprise an amount, a time, a merchant, and a location; and prompt the user to categorize at least one component of the transaction when the transaction meets the predefined criteria.

16. The computer program product of claim 13, the computer program product further comprising a computer readable program code configured to:
   access a database comprising a plurality of merchants and associated categories; and
   suggest categories based on the most frequently associated categories relating to the merchant.

17. The computer program product of claim 13, wherein the user is prompted to categorize the transaction using a mobile device and the system receives the category from the user via the mobile device.

18. The computer program product of claim 13, wherein the mobile device receives a verbal input from the user providing the category.

19. A method for prompting categorization during payment authorization of a transaction being conducted by a user, the method comprising:
   using a computer processor comprising computer program code instructions stored in a non-transitory computer readable medium, wherein said computer program code instructions are structured to cause said computer processor to:
      track the user's location using GPS coordinates provided by the mobile device when the user is located outside a facility;
      transmit a wireless proximity signal using one or more proximity marker devices, wherein:
         the or more proximity marker devices located inside the facility, the one or more proximity marker devices being configured to transmit the wireless proximity signal; and
         the wireless proximity signal is configured to be received by a positioning system device of the mobile device;
      determine the user's location when the user is located inside the facility based on receiving a response signal from the user mobile device indicating receipt of the wireless proximity signal of the one or more proximity marker devices;
      access a categorization database;
      determine a time of day;
      using the categorization database, determine that the user's location is associated with a plurality of categories for the determined time of day, wherein the plurality of categories are determined based on at least the response signal from the user mobile device;
      suggest the plurality of categories based on the user's location and the determined time of day based on products and/or services that the merchant provides;
      prompt the user to categorize at least one component of the transaction;
      receive a category from the user for the at least one component of the transaction;
      receive instructions, from the mobile device, to process the transaction and associate the received category with the at least one component of the transaction;
      in response to the instructions from the mobile device, initiate storing the category in association with the at least one component of the transaction in a categorization database; and
      in response to the instructions from the mobile device, process the transaction.

20. The method of claim 19, the method further comprising:
   authorizing the transaction when the user categorizes at least one component of the transaction.

21. The method of claim 19, the method further comprising:
   determining whether the transaction meets predefined criteria, wherein the predefined criteria comprise an amount, a time, a merchant, and a location; and
   prompting the user to categorize at least one component of the transaction when the transaction meets the predefined criteria.

* * * * *